United States Patent
Danaher

[15] 3,660,847
[45] May 2, 1972

[54] AIRCRAFT POSITION DISPLAY
[72] Inventor: Harry C. Danaher, Houston, Tex.
[73] Assignee: The Superior Oil Company, Houston, Tex.
[22] Filed: Aug. 30, 1968
[21] Appl. No.: 756,660

[52] U.S. Cl. .................343/112 PT, 340/24, 340/27 NA, 343/106 R
[51] Int. Cl. ...........................................G01s 5/02
[58] Field of Search .............343/112 PT, 106, 112 TC; 340/24, 27 NAV

[56] References Cited

UNITED STATES PATENTS

| | | | |
|---|---|---|---|
| 3,009,147 | 11/1961 | Fernandez | 343/112 PT UX |
| 2,183,634 | 12/1939 | Zworykin | 343/112 PT UX |
| 2,455,164 | 11/1948 | Ebeling | 343/112 PT UX |
| 2,637,848 | 5/1953 | Cunningham | 343/112 PT UX |
| 3,249,942 | 5/1966 | Fernandez | 343/112 PT UX |
| 3,277,484 | 10/1966 | Bostwick | 343/107 |
| 3,505,640 | 4/1970 | Cohen | 343/106 X |

Primary Examiner—Benjamin A. Borchelt
Assistant Examiner—Richard E. Berger
Attorney—Arnold, White & Durkee, Tom Arnold, Donald C. Roylance, Walter Kruger, Bill Durkee, Frank S. Vaden, III and John G. Graham

[57] ABSTRACT

An onboard position display for aircraft, including a map located in the passenger compartment with lights on the map corresponding to Omni stations. A control unit operated by the pilot activates one of the lights, representing the Omni station used for navigation. The control unit includes a frequency select dial which is set on the same frequency used at the time for the Omni receiver. DME and To-From indications are also provided. A memory device permits a series of the lamps to be lighted representing the flight path, with the lamp for the closest station blinking.

20 Claims, 6 Drawing Figures

FIG. 1

H. C. Danaher
INVENTOR

BY Arnold, Roylance,
Kruger & Durkee
ATTORNEYS

H. C. Danaher
INVENTOR

BY Arnold, Roylance,
Kruger & Durkee
ATTORNEYS

H. C. Danaher
INVENTOR

BY Arnold, Roylance,
Kruger & Durkee
ATTORNEYS

AIRCRAFT POSITION DISPLAY

When an aircraft is in flight, there is usually no way in which the passengers can determine the location of the plane. Landmarks are not visible from high altitude, particularly in bad weather or at night, and even if visible are not familiar to laymen. The pilot or navigator has precise information on the aircraft position at all times, but cannot interrupt his duties to convey this information to the passengers, except quite infrequently, perhaps once during a commercial flight. Particularly for business travelers, concerned with appointments at their destination, the vacuum of information about the progress of the aircraft during a several hour flight becomes quite annoying. On small company-owned jets, the passengers are given to repeated inquiries to the pilot regarding location, expected time of arrival, diversion of flight plan by weather, etc.. This distraction is not conducive to safety, and further is not satisfactory to the passenger who must leave his seat.

It is therefore a primary feature of this invention to provide position information to passengers in aircraft in a continuous manner, without significant interruption of the cockpit crew. Another feature is the provision of a visual display for the passenger compartment of an aircraft, which relates the position of the aircraft at the time to the geographical area and/or to the flight plan, and particularly a display which uses information already available in the cockpit without substantial additional duties for the crew in maintaining the display current.

In accordance with an exemplar embodiment of the invention, the position information already existing onboard from Omni and DME equipment is used for a display in the passenger compartment. Omni transmitting stations are spaced throughout the country in a fairly close pattern; a sequence of quite a number of these stations is used in a transcontinental flight. So, a rough approximation of the aircraft's location is provided by indicating which of the stations is being used by the pilot for navigation. The exact position is pinpointed more precisely by also displaying DME information and To-From information.

The display in the passenger compartment may well take the form of a map having lamps corresponding to each Omni station, with one of the lamps being lighted to indicate the station being used. A switch arrangement located in the cockpit is dialed to the same frequency numbers as the Omni receiver, either by separate knobs or by the same knobs as the receiver itself, so the pilot need not do any calculation or exert any other effort to select which light to turn on. A minimum of time on the part of the crew, and no training at all, is needed to operate the position display.

To account for the duplications in Omni frequencies used by stations in separate parts of the country, the display board may be split up into groups of lights which represent stations with no frequencies which are the same. These groups conveniently represent geographical areas corresponding to the high altitude navigation charts published by the government. Thus, the control unit includes an area select knob which is merely set on the same number as the identifying number on the chart being used; in this manner the thought and distraction imposed upon the crew is minimized.

By providing a memory unit for each lamp, a string of lamps may be lighted to represent the flight path, and the lamps will remain on during the entire flight. The closest station is indicated by blinking the corresponding light.

For commercial jets where the passenger compartment is quite large and the passengers usually remain in their seats, it would be preferable to have a display close enough to each passenger so that it may be readily seen. Instead of having a large number of the display boards, the board may be shown on T. V. monitors of the type used for inflight entertainment. The position display may be run continuously on one channel, while movies and T. V. programming are on the other channels.

Other information of interest may be made available at the position display board by merely repeating information available on indicators in the cockpit. For example, airspeed, altitude, time, temperature, Mach number, etc., may be displayed.

THE DRAWINGS

The novel features believed characteristic of the invention are set forth in the appended claims. The invention itself, however, as well as further features and advantages thereof, may best be understood by reference to the following detailed description of particular embodiments, when read in conjunction with the accompanying drawings, wherein:

It is noted that like parts appearing in several views of the drawings all bear like reference numerals. The drawings are considered a part of this specification and are incorporated herein.

DETAILED DESCRIPTION OF SPECIFIC EMBODIMENTS

Figures 1, 4:
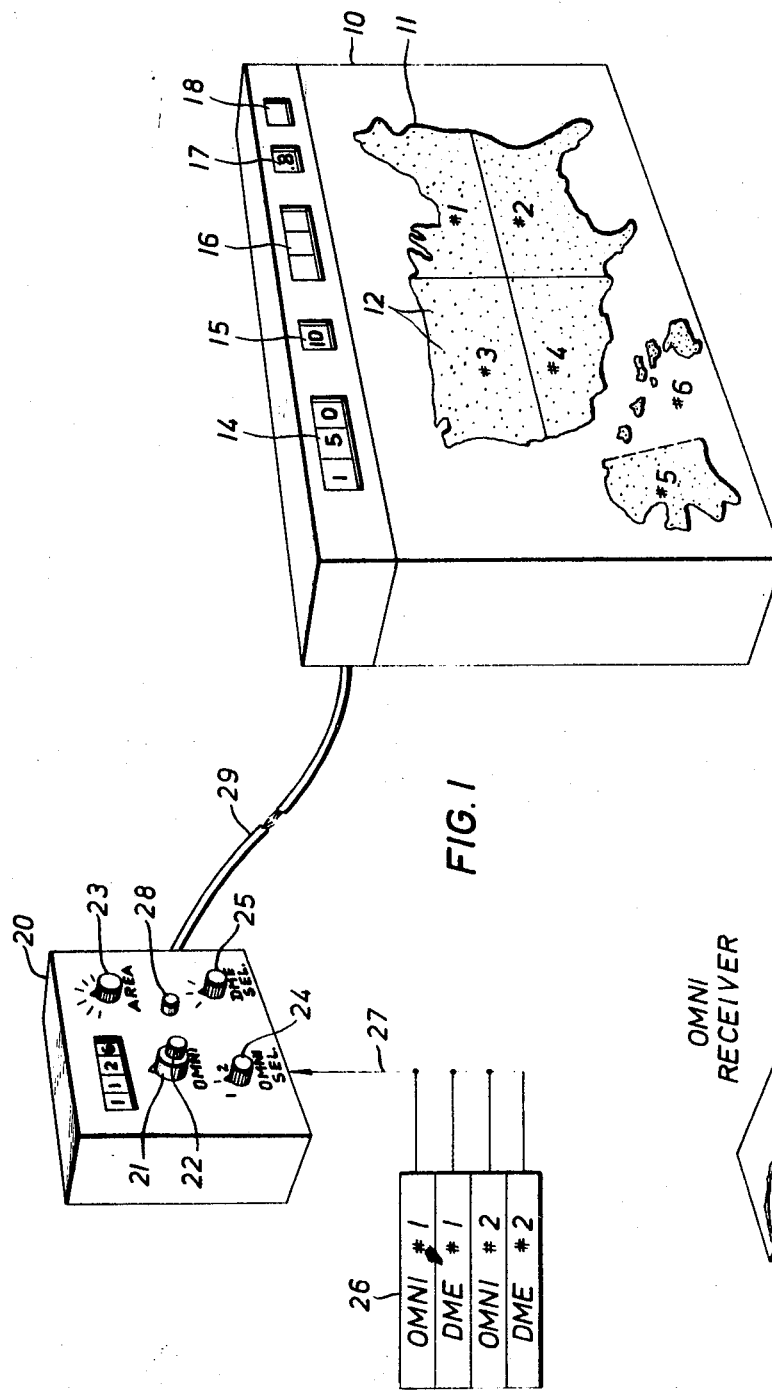
FIG. 1 is a pictorial view in schematic form of a position information display system for use in aircraft, according to the invention.
FIG. 4 is a detailed view in schematic form of a different arrangement for mounting the frequency selector for the system of FIG. 1.

With reference now to FIG. 1 of the drawings, one exemplar embodiment of an information display system for aircraft, according to the invention, is illustrated in schematic form. This system includes principally a display board 10, which would be positioned in the passenger compartment of an aircraft, such as a business or commercial jet liner. The display board 10 shows a map of the United States, although it is understood that it may illustrate only a localized area included in the flight plan, or another geographical region. In this regard, the front panel on the display board may be removable so that it may be replaced by a local map or a map of another country which the aircraft is to traverse. In any event, on the map 11 are superimposed a large number of small lights 12. These lamps are positioned to coincide with the geographical locations of Omni transmitters which contain DME signals incident thereto. There are many more Omni stations for general aviation than would be conveniently included on the map, so in the exemplar embodiment only the stations used by high altitude jet aircraft are represented on the board 10 by lamps 12, since these are the only ones which would ever be used by the pilot of the aircraft of this type. Usually, these high altitude stations are also the only ones including DME signals. In particular, there are about 95 of these stations used by high altitude aircraft in the United States.

It is noted that the map 11 is divided into four quadrants — # 1 through # 4 — this being necessary due to the fact that a given Omni frequency will be repeated several times throughout the continental United States. For example, Atlanta and Seattle stations might have the same frequency, so when this frequency is dialed only one lamp should light up. Thus, the quadrant of the flight path is selected by the pilot, and only this quadrant will be operative at one time. Other areas outside the continental United States, such as Alaska and the Hawaiian Islands, may be designated as further areas # 5 and # 6, as seen on the display board 10.

Associated with the display board 10 is a further information display, including a distance indicator 14 which might contain information derived from the DME (distance measuring equipment) associated with the high altitude Omni stations. A To-From indicator 15 is also provided, this information being derived from the same phase sensitive apparatus which provides the To-From indication for the Omni indicators in the cockpit. From these three indications, the particular lamp 12 which is lit indicating which station is closest, the distance indicator 14 and the To-From indicator 15, a passenger may readily determine the exact position of the aircraft at any time, this information being produced with a minimum of interruptions of extra duties for the pilot or co-pilot.

In addition, the display board includes an indicator 16 which reads ground speed in miles per hour as derived from a Doppler radar type ground speed indicator of the kind usually included in aircraft of this type. A mach indicator 17 is also provided to read the percentage of speed of sound, which of course may vary with altitude, humidity and the like. A further indicator 18 reads the exterior temperature, which of course would be of most significance or interest to the passengers when the aircraft has landed, rather than at high altitudes.

The display board 10 is controlled from the cockpit by a control panel 20, which may be mounted on the overhead between the pilot and co-pilot. The control panel, explained here as being a separate unit, might be combined with the Omni and DME controls, as set forth below. A frequency select knob including a full megacycle control 21 and a tenths control 22 is set by the pilot on the same Omni frequency to which the Omni receiver is tuned for navigation purposes. Also, the pilot selects the quadrant or area, #1 through #6, by an area select knob 23 which functions to enable any one of the lamps in one of the quadrants or areas to be energized. The setting of the knobs 21 and 22 then energizes one, and only one, of the lamps in this selected quadrant.

The quadrants or areas #1 through #4 coincide with the high altitude en route charts published by the United States Coast and Geodetic Survey. So, the pilot or co-pilot merely sets the knob 23 on the same number as the number of the high altitude chart he is using at the time.

The control panel 20 also includes an Omni select switch 24 and a DME select switch 25, these being for the purpose of determining the output of which of the Omni units and which of the DEM units are displayed on the To-From indicator 15 and the distance indicator 14 at the display board 10 in the passenger compartment. The Omni and DME equipment 26 ordinarily provided in an aircraft of this type includes two complete sets of Omni and DME systems, with the To-From and range information being applied to the control panel 20 by a cable 27.

The Omni/DME equipment 26 would be operated in the usual manner. Ordinarily, the No. 1 set would be tuned to the Omni station ahead of the aircraft by the pilot, while the No. 2 set would be tuned to the station behind the aircraft by the co-pilot. However, when making an approach to land, the situation would be different since the outer marker and middle markers are referenced. In any event, the pilot would select one or the other of the Omni units and the DME units to display the most meaningful information to the passengers on the display board 10.

A pulse control switch 28 on the control panel 20 actuates circuitry which provides an unusual visual effect. By tuning the switch 28 on "on," the lamps 12 on the display board are caused to flash on in a seemingly random fashion. This function would be used for decorative effect, rather than positional indication, when the aircraft is occupied but not in flight, as when waiting at the ramp or on the taxiway for take-off. The circuitry for producing this pulse feature will be described in detail below.

The control panel 20 is interconnected with the display board 10 by a multiconductor cable 29. In practice, the display board 10 would include several distinct units, one of these being the map board itself with permanently mounted lamps, wiring and certain relays. This portion would be removable and replaceable so that various geographical areas would be covered. The display including the indicators 14 – 18 would be a unit apart from the map board. In addition, certain of the pulse and test circuitry would be permanently associated with the display console, rather than being removable with the map.

Figure 2:
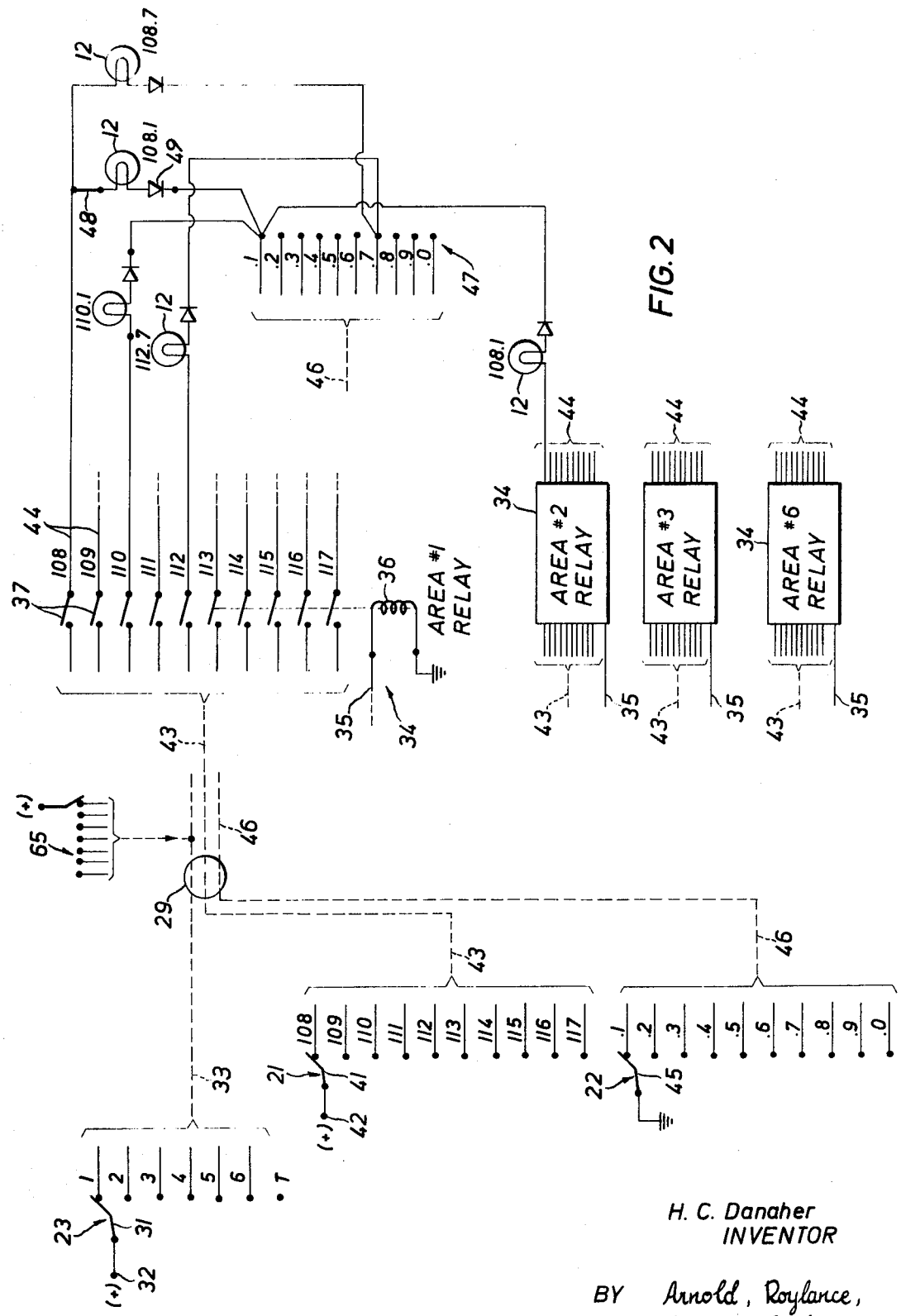
FIG. 2 is a schematic diagram of one embodiment of electrical circuitry which may be used in part of the system of FIG. 1.

Referring to FIG. 2, a simplified schematic diagram illustrates the circuitry contained in the system of FIG. 1. The arrangement for selecting the particular one of the lamps 12 on the display board 10 to be lighted will be first described.

The area select switch 23 is a seven-position rotary switch having a moveable contact 31 which is energized from a supply voltage source 32. Six of the stationary contacts are connected by six separate conductors through a cable 33, which is part of the cable 29, to the coils of six separate area relays 34. Thus, when the moving contact 31 in the select switch 23 is on the first position, a positive voltage will be applied to a terminal 35 of the coil 36 for area relay #1, the other terminal of the coil being grounded. This relay includes 10 separate parallel sets of contacts which are normally open but which all close simultaneously when the coil is energized. All of the other area relays #2 through #6 are of exactly the same form as #1, but are illustrated in block form for simplicity. As seen, when the area select switch 23 is set on a particular area, this means that one and only one of the area relays #1 to #6 will be actuated. All of the others will have all of their contacts 37 open.

The Omni frequency select switches, including the so-called megacycle switch 21 and the tenths switch 22, are each separate 10-position rotary switches, although these are ordinarily physically mounted with concentric shafts. The megacycle or megahertz select switch 21 includes a moving contact 41 which is connected to a positive voltage source 42. Since this will be the supply voltage for the lamps to be lighted, a variable resistor (not shown) may be in series with the supply 42 to control the brightness of the lamps. The 10 stationary contacts for the switch 21 correspond to the 10 full megacycle frequencies included in the Omni range, i.e., 108 – 117 megacycles. These 10 contacts are connected separately through a cable 43, part of the major cable 29, to one side of each of the 10 contact pairs 37 for each of the area relays Nos. 1 – 6. Thus, depending upon the position of the moving contact 41, one of the lines in the cable 43 will have a positive voltage thereon, and this will be present on one side of this particular one of the ten contacts 37 in each of the area relays. Now, only one of the area relays #1 to #6 is activated at one time, so only one of the output lines 44 will have a positive voltage applied to it on the entire board. However, there may be several lamps in any quadrant or area which have a full megacycle frequency which is the same, such as 108.1 and 108.7, as seen in the diagram of FIG. 2 as an example. Only one of these will be lighted, however, due to the function of the tenths megacycle switch 22.

The tenths megacycle select switch 22 includes a moving contact 45 which is connected to ground, while the 10 stationary contacts corresponding to .0 to .9 are separately connected by conductors in a cable 46, part of the cable 29, to 10 terminals at a terminal board 47. Thus, one of the 10 terminals of terminal board 47 will be grounded by the action of the switch 22, while the remainder will be open. If the moving contact 45 is on the .1 contact, then only a lamp corresponding to a frequency ending in .1 can be lighted, such as 108.1, 110.1, etc..

Considering now one of the lamps as an example to trace the circuit, there is seen that a lamp 12 corresponding to a 108.1 frequency has one side connected by a conductor 48 to one of the output conductors 44 from the switches 37 in area relay #1, this output 44 corresponding to the full megacycle frequency of 108 and thus being connected through the cable 43 to the first contact position of the rotary switch 21. If the moving contact 41 is on the first position, a positive voltage will thus be applied to one side of this lamp at the conductor 48, in this example. The other terminal of this particular lamp is connected through a diode 49 to the .1 terminal at the terminal board 47, and thus by the cable 46 to the .1 position contact of the rotary switch 22. A circuit will be completed to supply current through the 108.1 lamp in the area #1 relay quadrant, so if the area select switch 23 is also in the #1 position, the contacts 37 will be closed and this lamp will light up.

The function of the diode 49 for this lamp, and similar diodes for all of the other lamps, is to prevent feedback from one lamp to others since one side of many of the lamps will be connected in common to the various terminals 47.

Considering this same example of the 108.1 lamp in the first quadrant, it may be noted that a positive voltage will likewise be applied to one side of a 108.7 lamp, or any other lamps corresponding to stations with a full megacycle frequency of 108. However, the 108.7 lamp will not be lit, even though one side is energized, because the other terminal of this lamp will not be grounded. Instead, the .7 terminal in the terminal block 47 will be open because, in this example, it is assumed that the moving contact 45 in the switch 22 is on .1, not .7. Further, other lamps representing frequencies ending in .1, such as 110.1, will not be lighted even though one side of such lamps is grounded through the .1 terminal, because the 110 line in the output 44 from the area relay will not have a positive voltage thereon. Moreover, a 108.1 lamp for the quadrant covered by the area relay #2 will not be lighted, even though one side is grounded at the .1 position of the terminal block 47, because the coil input 35 for this #2 relay will not be energized, the moving contact 31 in the area select switch 23 being on the #1 contact. Since its coil is not energized, all of the contacts 37 in the #2 relay will be open, and so no positive voltage will be on any of the output lines 44.

It may be noted that since there are 10 output lines 44 for each area relay and ten terminals at the terminal block 47, there is provision for 100 different frequencies in each area. However, each frequency will not occur in each quadrant, so many possibilities will be unused.

There are, unfortunately, a few duplications of frequencies for high altitude stations within a quadrant, so to avoid anomalies the least used one of the duplicated frequencies may be merely omitted from the map; in the remote likelihood that the aircraft passes over this station, the map display would be briefly inoperative, or the frequency for the next following station could be set, in which case probably no DME information would be available. If stations with duplicated frequencies in a given quadrant are often used by a particular aircraft, one may be connected into the output of an adjacent area relay, and this exception noted by the cockpit personnel in setting the control panel.

The circuitry for providing the pulse function will now be described with reference to FIG. 3. The test arrangement will also be described since it is interrelated with the pulse sequence. Generally, when the pulse switch 28 is closed at the control panel 20, a positive voltage is applied through the cable 29 on a conductor 51 to energize a relay coil 52. Also, this positive voltage is applied by a line 53 to all of the inputs 35 to the coils of the area relays so that all of the area relays will be activated, closing their contacts 37, when the pulse switch 28 is closed. The relay 52 includes three sets of normally open contacts. The first pair 54 functions to apply a positive voltage from a source 55 to a line 56 which is connected through isolating diodes 57 to the ten conductors of the cable 43 or each of the cables 43, so that a positive voltage is applied to one side of all of the lamps 12 on the entire display board. Any of the lamps 12 may thus be turned on by grounding the other side. To this end, all of the ground terminals 47 are connected by the 10 conductors of the cable 46 to 10 contacts of a rotary switch 58, through isolating diodes. A moving contact 59 for this rotary switch is connected to ground through a pair of contacts 60 operated by the relay coil 52. The moving contact 59 is operated by a small D.C. motor 61 which is energized through a pair of contacts 62, also operated by the relay coil 52. Thus, when the relay coil 52 is energized, the contacts 62 close and apply operating voltage to the motor 61 which then moves the contact 59 in sequence through the 10 contacts repeatedly. As the moving contact 59 engages each of the 10 contacts, all of the lamps 12 on the board which represent frequencies ending in a given tenth megacycle will light up. At any instant, one-tenth of the lights on the board will be lit, but the visual impression will be a random blinking of the lights. The rotary switch 58-59 may be implemented by 10 microswitches and a cam arrangement for closing the switches in an arbitrary sequence.

Figure 3:
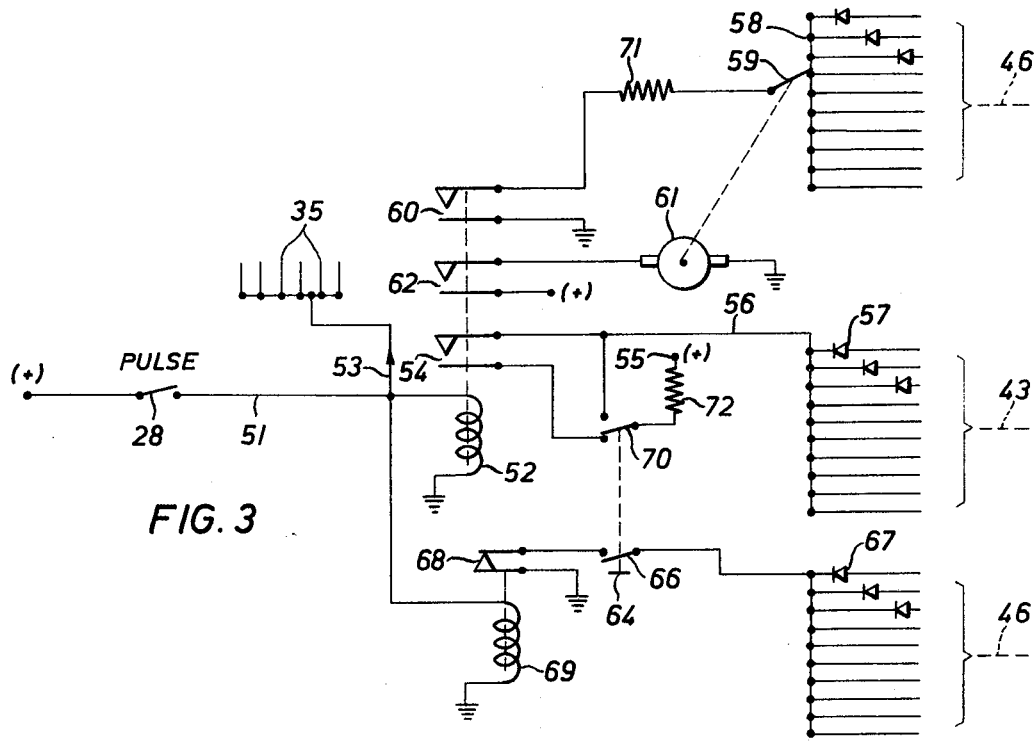
FIG. 3 is a schematic diagram of another portion of the electric circuitry used in one embodiment of the system of FIG. 1.

The test function is implemented by a press-to-test switch 64 seen in FIG. 3, along with an area select switch 65 seen in FIG. 2. Each area is separately tested, so only one area lights up at one time. At the control panel 20, the area select switch is moved to place the moving contact 31 on the seventh position or "T" position so that no energizing voltage is applied to any of the area relays from the switch 23. The switch 65 now controls, and is manually positioned in sequence to energize each area relay as desired. With one area relay energized and the others de-energized, the press-to-test switch 64 is depressed manually, functioning to light all of the lamps 12 for this area. When the switch 64 is depressed, a pair of contacts 66 are closed, functioning to ground all of the terminals 47 through the 10 lines of the cable 46 and isolating diodes 67, this path including a pair of contacts 68 operated by a relay coil 69. The function of the relay 69 and its normally closed contacts 68 is to prevent the test circuitry from being operated while the pulse sequence is energized. Thus, the coil 69 is connected to the line 51, so whenever the switch 28 is closed the coil 69 is energized and the contacts 68 will be open, preventing any effect of closing the contacts 66 by the press-to-test switch.

Depressing the switch 64 will also operate contact 70 to apply positive voltage directly from the source 55 to the line 56, bypassing the contacts 54, so that a positive voltage will be applied to the 10 conductors of the cable 43 to all of the contacts 37 in all of the area relays. For the particular area relay which is activated, a positive voltage will be applied to all of its lamps 12. Since the other side of these lamps will be grounded through the contacts 66, 68, all of the lamps for this area should be lighted. If any are not, they may be replaced or the malfunction determined.

It is noted that resistors are shown in series with the power supply at one point or another in each of the different circuit functions. For example, a resistor 71 in series with the ground side of the pulse circuitry is needed because not as many of the lamps will be lit during pulse as during the test function. No limiting resistor is shown in series with the ground side of the test circuitry, i.e., the circuit including the switches 66 and contact 68. A resistor 72 in series with the positive side for both the pulse and test functions, i.e., in series with the source 55, is illustrated. This may be a variable resistor. Not shown are variable resistors in series with the power supplies, either in the positive or negative side, for the routine display function where only one lamp would be on. This may be considered brilliance or luminescence control and would be located at the display board to control the brightness of the lamp, as for day or night operation.

As explained above, the frequency selector switches 21 and 22 may be mounted on the same shaft as the frequency select knobs for the Omni equipment itself, rather than at a separate control console 20. Such an arrangement is illustrated in FIG. 4, where it will be understood that the two concentric shafts would control the variable reactances for the Omni receiver, and would also mechanically rotate the moving contacts 41 and 45 for the frequency select switches. Thus, when an Omni station is dialed for navigation, the display board 10 indicates the same station without further action by the pilot or co-pilot. Of course, area select and Omni 1 and 2 and DME 1 and 2 selections would still have to be provided on the control panel 20, but the actions by the cockpit personnel would be greatly reduced.

Figure 5:
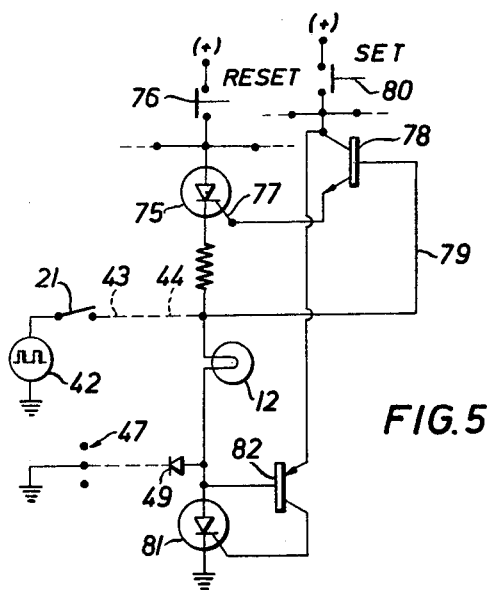
FIG. 5 is a schematic diagram of a memory circuit used in another embodiment of the system of FIG. 1.

Another embodiment of the invention is illustrated with reference to FIG. 5. A memory unit is provided for each of the lamps 12 so that a string of lamps may be lighted to indicate the flight path from take-off to landing, while only one of the lamps indicating the closest station would be blinking on and off. In FIG. 5, only one of the lamps 12 with its associated isolating diode 49 is illustrated, although all other lamps would have the same memory arrangement. The lamp 12 of FIG. 5 is connected on one side through one of the area relay output lines 44 and by one of the conductors of the cable 43 through the switch 21 to a positive supply 42', as in FIG. 2. But here, the positive supply is a pulse source, as will be explained. The negative side of the lamp 12 is selectively grounded through a diode 49 and one of the terminals 47, as before. To provide the memory function, there is connected in series with each of the lamps 12 a controlled rectifier 75 or similar switching device. The anode of the controlled rectifier is connected to a positive supply through a Reset switch 76, this being a normally closed push-button switch. So long as the switch 76 is closed, the positive voltage will be available at the anode of all of the controlled rectifiers 75, there being one of these devices 75 for every one of the lamps 12. The cathode of each controlled rectifier is coupled to a different one of the lamps 12, so it is seen that there are two different paths for lighting each lamp, one through the circuitry just as in FIG. 2, i.e., the output lines 44, etc., and the other through the associated controlled rectifier 75 for this lamp. The characteristic of a controlled rectifier of this type is that once the device is turned on, it will continue to conduct until its anode voltage is reduced to zero or below a threshold. The device is turned on by a positive current pulse applied to its gate electrode 77. Such a current pulse is provided through the collector-emitter path of an NPN transistor 78 if this transistor is turned on by a voltage appearing on the base of this transistor, this base being connected across the lamp by a line 79. The collector voltage for the transistor 78 is provided through a Set switch 80. The Set and Reset switches 80 and 76 would be located on the control panel 20.

The arrangement thus far described functions to maintain a positive voltage on the plus side of any lamp 12 which is "addressed," even after the frequency select knobs 21 and 22 are turned to another frequency, and regardless of which area the area select may be turned to. However, since the ground or negative is removed when another lamp is addressed, another memory function is provided for each lamp on the ground side. This second memory function includes another controlled rectifier 81 having its anode connected directly to the ground side of the lamp, while the cathode is connected to ground (or a voltage supply of a negative magnitude sufficient to cause the device to conduct when its anode is almost at ground). The gate of the SCR 81 is connected to the collector of a PNP transistor 82, and the emitter of this transistor is connected to the positive supply through the Set switch 80. The base of the transistor 82 is connected to the ground side of the lamp 12, so this transistor can be turned on only if this particular lamp is grounded through the tenths switch 22.

In operation of the embodiment of FIG. 5, a string of lamps 12 would be lighted to indicate the flight path by the following procedure. The Omni stations over which the flight plan will carry the aircraft are first selected by the pilot, co-pilot or navigator. Then, before take-off, each of these frequencies in the quadrants to be traversed is dialed on the frequency select knobs 21 and 22. After each specific frequency is dialed, the Set button 80 is pressed. This applies a positive voltage to the collector of all of the transistors 78, and the emitter of all of the transistors 82, there being one of each of these transistors for every one of the lamps 12. Only one of the transistors 78 will turn on and conduct current to the gate 77 of its associated controlled rectifier, however, because only one of these transistors will have a positive voltage applied to its base via the line 79. This is because the supply voltage from the source 42' will be applied only to the particular one of the lamps 12 associated with this particular selected frequency and quadrant. So, pressing the Set switch 80 will gate on the controlled rectifier 75 for the selected lamp, but none of the others. At the same time, the controlled rectifier 81 for this lamp will be gated on, so ground will be maintained for this lamp regardless of what is subsequently done with the selector switches 21 and 22. Then, when the next frequency is dialed, the positive voltage from the source 42' will be removed from the line 44 for this previously selected lamp and will be applied to another lamp. Nevertheless, the prior lamp will continue to be lighted because its controlled rectifiers 75 and 81 continue to conduct. Accordingly, every lamp which is dialed or "addressed" will remain lighted. In this manner, every lamp for every station along the flight plan to be used for navigation may be turned on before take-off. Then, during the flight, when each station is again dialed, as these stations are used for navigation, each of these lamps in sequence will again be "addressed." Now, the function of the pulsating source 42' will be apparent. The voltage supplied by the source 42' switches between a positive voltage sufficient to light the lamps and a lower voltage sufficient to cause some current from the rectifier 75 to pass through the source 42' on the negative half cycle rather than through the corresponding lamp 12, but not low enough to eliminate any current flow through the lamp and through the SCR 81, so the ground path through the SCR 81 will not be extinguished. Thus, the lamp for the Omni station being used will, when addressed, blink at the rate determined by the squarewave source 42', while the others will remain energized steady. The rectifier 75 for the addressed lamp will not be extinguished because it will continue to conduct on the lamp-off cycles through the source 42', as well as slightly through the lamp.

Accordingly, using the memory arrangement of FIG. 5, a string of lamps will be lighted, but one will be blinking during flight in accordance with the nearest Omni station or the one being used for navigation. The board is reset by pressing the reset button 76 which breaks the circuit to all of the controlled rectifiers, turning them off.

Figure 6:
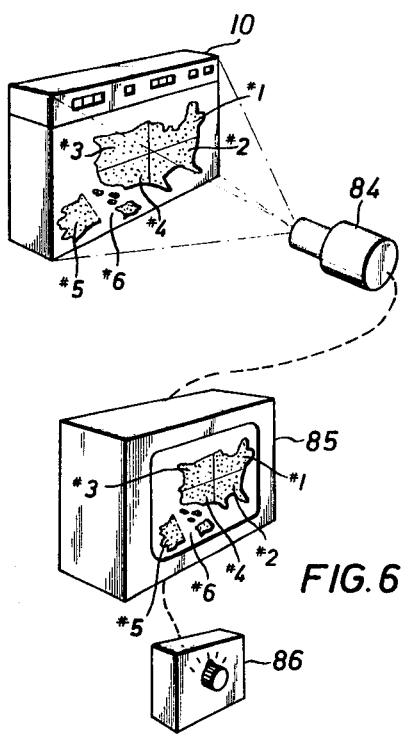
FIG. 6 is a schematic pictorial view of a different embodiment of a display system according to the invention.

With reference to FIG. 6, an embodiment of the invention is illustrated which is particularly adapted for use in commercial aircraft having a closed circuit T. V. system with individual T. V. monitors and channel selectors for each passenger or for each small group of passengers. In this embodiment, a display board 10 of the same type described above, would be positioned in a remote location in the aircraft and would have a closed circuit T. V. camera 84 trained thereon. The video output would be transmitted by the usual cables to all of the T. V. monitors 85. A channel selector 86 would be provided each seat or group of seats so that a passenger could select live T. V. programming, movie, exterior sight-seeing, or the positional information from the display board 10, as desired. Of course, air speed, DME, To-From, outside temperature, time and other information could be simultaneously displayed as before. Instead of showing the entire map, the camera 84 may be focused or zoomed in upon a localized area to improve resolution of the exact position.

While the invention has been described with reference to particular illustrative embodiments, this description is not to be construed in a limiting sense. Various modifications of the disclosed embodiments, as well as other embodiments of the invention, may be apparent to persons skilled in the art upon reference to this description. It is therefore contemplated that the appended claims will cover an such modifications or embodiments as fall with the true scope of the invention.

What is claimed is:

1. Position display apparatus for use on an aircraft or the like comprising:
    a display board positioned in the passenger compartment of the aircraft and exhibiting a map-like indicia,
    a large number of lamps arranged on the display board to correspond to geographical positions of selected transmitting stations, with one lamp for each station, certain ones of the lamps being connected together in groups corresponding to geographical regions which generally contain no two of such stations transmitting at the same frequency,
    a distance indicator associated with said display board and operative to display a number corresponding to the distance between the aircraft and the station for a particular lamp,
    an orientation indicator associated with said display board and operative to indicate relative positional information.

2. Apparatus according to claim 1 wherein the transmitting stations are Omni stations, the distance indicator displays "D-ME" information, and the orientation indicator displays "To-From" information.

3. Apparatus according to claim 1 wherein only one lamp is lit at one time, corresponding to one of the closest transmitting stations, and wherein the distance indicator corresponds to the energized lamp.

4. Apparatus according to claim 1 wherein a control device is provided in the cockpit of the aircraft whereby the pilot may selectively energize particular lamps corresponding to the transmitting station used for navigational purposes.

5. Apparatus according to claim 1 wherein means are provided for selecting a particular one of said groups corresponding to the region traversed by the aircraft.

6. A position indicator system for the passenger compartment of an aircraft or the like comprising:
a display panel exhibiting a map-like indicia,
a plurality of lamps fixed on the display panel, each corresponding to the geographical position of a different navigational signal transmitter in the geographical area traversed by the aircraft,
control means located in the vicinity of the pilot compartment and effective to actuate automatically selected lamps indicating the flight path of the aircraft, one lamp being actuated in a different character to indicate the approximate position of the aircraft.

7. A position indicator system for the passenger compartment of an aircraft or the like comprising:
a display panel exhibiting a map-like indicia,
a plurality of indicator means fixed on the display panel, each corresponding to the geographical position of a different navigational signal transmitter in the geographical area traversed by the aircraft, said indicator means being arranged in groups on the display panel to correspond to geographical regions which contain virtually no transmitters operating at the same frequency,
control means located in the vicinity of the pilot compartment and effective to actuate automatically selected indicator means, the indicator means being selected corresponding to a transmitter used for navigation of the aircraft.

8. A system according to claim 7 wherein the control means includes switching means set by frequency, and area select means to enable only one of such groups to be energized.

9. A system according to claim 8 wherein the geographical regions are defined according to navigational charts, whereby the area select means may be controlled according to the chart used for navigation of the craft.

10. A system according to claim 9 wherein the area select means includes a multiple contact remotely actuatable switching device for each such group.

11. A system according to claim 10 wherein the switching means includes two separate multiple contact switches, one corresponding to the full integer megacycle Omni frequency select and the other corresponding to tenth megacycle select.

12. A system according to claim 11 wherein the switching means is operated by mechanical means coupled to the switches used for selecting the Omni station used for navigation.

13. A system according to claim 11 wherein each lamp includes a memory device to maintain the lamp in an energized state after the lamp has been actuated from the switches until the lamps are reset.

14. A system according to claim 13 wherein a pulsating electrical source is applied to one of such lamps to indicate the closest one of a number of transmitting stations along a previously indicated flight path.

15. A position indicator system for the passenger compartment of an aircraft or the like comprising:
a display panel exhibiting a map-like indicia, said display panel being positioned remotely from the passenger compartment,
means for reproducing the display panel in the passenger compartment by a closed circuit type television arrangement,
a plurality of indicator means fixed on the display panel, each corresponding to the geographical position of a different navigational signal transmitter in the geographical area traversed by the aircraft,
control means located in the vicinity of the pilot compartment and effective to actuate automatically selected indicator means, the indicator means being selected corresponding to a transmitter used for navigation of the aircraft.

16. A system according to claim 15 wherein a plurality of channels of television programming are provided for the passengers, and selection means are provided therefor.

17. A system according to claim 16 wherein the camera for the television arrangement may be trained upon only a part of the map.

18. Positional display apparatus for use in a moving vehicle comprising:
a visual display panel exhibiting geographical information,
a plurality of lamps associated with the display panel and corresponding in relative position to navigational radio transmitters, said lamps directly indicating the location of the vehicle with respect to the geographical information exhibited on said visual display panel,
means for automatically actuating said lamps in accordance with said navigational radio transmitters, said means for automatically actuating including switch means corresponding to frequency select means used for tuning receiver means to the radio transmitters.

19. Apparatus according to claim 18 wherein said lamps are grouped according to geographical regions which generally contain no such transmitters operating on the same frequency, and the means for selectively actuating includes means for selecting one of said groups.

20. Apparatus according to claim 19 wherein means for indicating distance between the vehicle and the reference, are associated with the display panel.

* * * * *